H. A. RYTHER.
GLASS CUTTER.
APPLICATION FILED JUNE 14, 1921.
1,419,310.
Patented June 13, 1922.
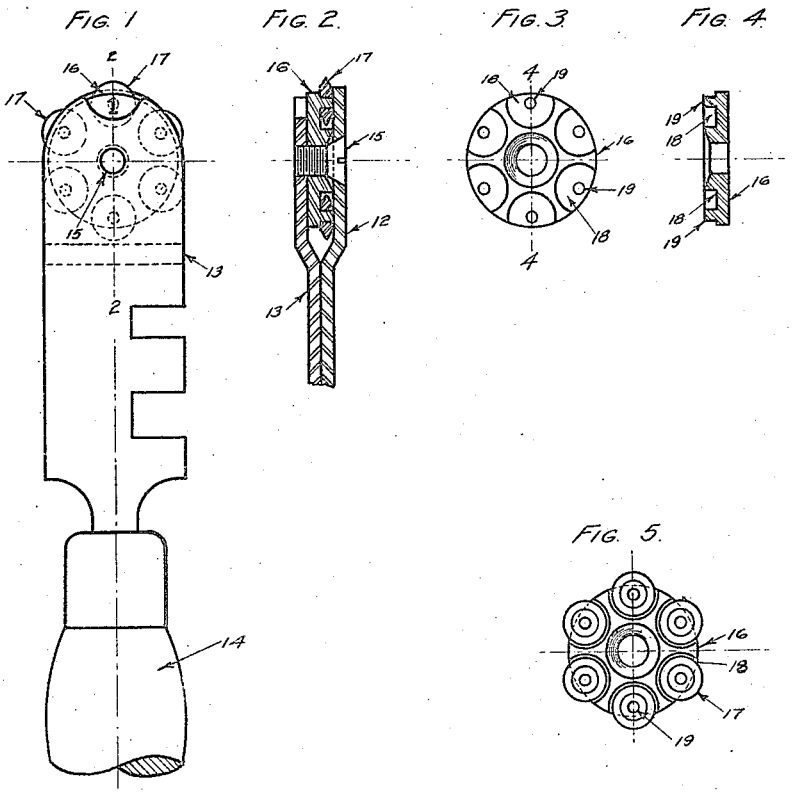
INVENTOR
Henry A. Ryther
BY
ATTORNEYS

UNITED STATES PATENT OFFICE.

HENRY A. RYTHER, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

GLASS CUTTER.

1,419,310.

Specification of Letters Patent.   Patented June 13, 1922.

Application filed June 14, 1921.   Serial No. 477,452.

*To all whom it may concern:*

Be it known that I, HENRY A. RYTHER, a citizen of the United States, residing at Millers Falls, Montague, in the county of Franklin and State of Massachusetts, have invented new and useful Improvements in Glass Cutters, of which the following is a specification.

This invention relates to a glass cutter which includes a discoidal turret, a plurality of glass-cutting wheels carried by the turret and adapted to rotate independently thereon, and a turret-clamping holder composed of jaws at opposite sides of the turret and a clamping-screw connecting the jaws, said screw forming a bearing on which the turret is rotatable when the screw is loosened, the turret being confined against rotation when the screw is tightened.

Heretofore the turret has been relatively thin and provided with a series of separately formed studs or pins, driven into holes formed in the turret and projecting from one of its sides, the cutters being journaled on said studs and located entirely at one side of the surface of the turret from which the studs project.

The operations of drilling the turret to form stud-receiving holes, and of inserting the studs in said holes, consume considerable time. The inserted studs are liable to be out of parallelism with each other and not exactly at right angles with the turret surface from which they project, so that the wheels are liable to bind on the studs and drag, instead of rotating freely, when cutting. The clamping pressure of one of the jaws is wholly on the outer ends of the studs and not on the body of the turret, so that the studs have to sustain more of the clamping pressure which confines the turret than is desirable.

The present invention has for its object to overcome the above-mentioned and other objections, and it consists in the improvements in the form and construction of the turret hereinafter described and claimed.

Of the accompanying drawings forming a part of this specification,—

Figure 1 is a side view, showing in an enlarged scale a turret glass-cutter of the type to which my invention relates.

Figure 2 is a section on line 2—2 of Figure 1.

Figure 3 is a side view of the turret.

Figure 4 is a section on line 4—4 of Figure 3.

Figure 5 is a view similar to Figure 3, showing the cutters in place in the turret.

The same reference characters indicate the same parts in all of the figures.

In the drawings, 12 and 13 represent jaws secured to a handle 14, and connected by a clamping-screw 15, said jaws and screw comprising a well known form of holder for a turret 16, carrying a plurality of glass-cutting wheels 17.

In carrying out my invention, which relates entirely to the form and construction of the turret, I make the turret as a relatively thick disk, the thickness of which conforms to the space between the jaws 12 and 13, the sides of the disk being flat and parallel with each other, so that each side is in contact with one of the jaws.

I counterbore one side of the discoidal turret in such manner as to form a series of circular cavities 18, and a series of integral studs 19, arranged in said cavities, a hollow boring tool or drill being employed, adapted to form an annular bore and leave a cylindrical stud at the center of the bore.

The studs are formed to enter the orifices of the usual hardened steel cutting-wheels 17, the wheels turning freely on the studs. The diameter of the bores or cavities 18 is such that the annular cutting edges of the wheels 17 are spaced from the walls of the cavities, as shown by Figures 2 and 5. The cavities are so located that they intersect the periphery of the turret, so that each cavity has a mouth through which a portion of the accompanying wheel projects, the major portion of the cutting edge of each wheel being within and protected by a cavity.

It will be seen that the wheels are located between the planes of the opposite sides of the turret, the thickness of the turret being sufficient to form a solid body portion from which the studs 19 project, and a counterbored portion containing the studs, the outer ends of the studs being flush with the counterbored side of the turret. The turret, therefore, presents two flat sides on which the jaws 12 and 13 bear simultaneously, so that the jaws are in gripping contact with both sides of the turret. I am enabled by counterboring the turret as described, to ensure absolute parallelism of the studs 19 with each other, and the location of each stud exactly at a right angle with the plane of the turret, so that the wheels 17 cannot bind on the studs and drag when cutting. Although the counterbored side of the turret presents a smaller area to the jaw 12 than that presented to the jaw 13 by the opposite side of the turret, the counterbored side presents sufficient area to cooperate effectively with the jaw 12, and prevent the pressure of said jaw from being sustained entirely by the studs.

I claim:

In a turret glass cutter which includes a turret-holder composed of a pair of spaced apart jaws and a clamping-screw; a relatively thick wheel-carrying turret having counterbored cavities in one side intersecting the periphery of the turret, so that each cavity has a mouth on said periphery, and integral studs located in said cavities, and supporting the usual glass-cutting wheels, said cavities being formed to protect the major portions of the wheels, and to permit other portions to project outward from the periphery of the turret, the thickness of the turret conforming to the space between the said jaws, so that each side of the turret contacts with one of the jaws.

In testimony whereof I have affixed my signature.

HENRY A. RYTHER.